US012353522B2

(12) United States Patent
Van der Schaaf

(10) Patent No.: US 12,353,522 B2
(45) Date of Patent: Jul. 8, 2025

(54) SYSTEMS AND METHODS FOR MONITORING SOFTWARE ITEMS BASED ON GENERATED CONTRACTS

(71) Applicant: Acronis International GmbH, Schaffhausen (CH)

(72) Inventor: Martijn Van der Schaaf, Zuidland (NL)

(73) Assignee: Acronis International GmbH, Schaffhausen (CH)

( * ) Notice: Subject to any disclaimer, the term of this patent is extended or adjusted under 35 U.S.C. 154(b) by 179 days.

(21) Appl. No.: 17/943,267

(22) Filed: Sep. 13, 2022

(65) Prior Publication Data

US 2024/0086499 A1  Mar. 14, 2024

(51) Int. Cl.
*G06Q 30/00* (2023.01)
*G06F 21/10* (2013.01)
*G06Q 30/018* (2023.01)

(52) U.S. Cl.
CPC ......... *G06F 21/105* (2013.01); *G06Q 30/018* (2013.01); *G06F 21/1073* (2023.08)

(58) Field of Classification Search
CPC .. G06Q 30/018; G06F 21/105; G06F 21/1073
See application file for complete search history.

(56) References Cited

U.S. PATENT DOCUMENTS 9,626,668 B2 * 4/2017 Raley ................... G06Q 20/382
10,380,339 B1 * 8/2019 Appalaraju ............ G06F 21/577
2015/0193607 A1 * 7/2015 Li .......................... G06F 21/105
   726/27
2019/0073680 A1 * 3/2019 Knox .................... G06F 21/105
(Continued)

FOREIGN PATENT DOCUMENTS

WO  WO-2021123916 A1 *  6/2021  ............. G06F 16/27

OTHER PUBLICATIONS

Marotta-Wurgler, Florencia. "What's in a Standard Form Contract? AN Empirical Analysis of Software License Agreements." Journal of Empirical Legal Studies, vol. 4, Issue 4, pp. 677-713, Dec. 2007. (Year: 2007).*

(Continued)

*Primary Examiner* — Luis A Brown
(74) *Attorney, Agent, or Firm* — ArentFox Schiff LLP; Michael Fainberg

(57) ABSTRACT

Disclosed herein are systems and method for monitoring software items using a generated contract, the method including: transmitting a quote for viewing on a computing device associated with a first person, wherein the quote includes a list of software items included in a transaction; in response to receiving an approval of the quote by the first person, generating a contract governing the transaction by: extracting the list of software items from the quote; retrieving software item information for each of the list of software items; determining, based on the software item information and for inclusion in the contract, usage conditions that the first person has to comply with to access software items in the list of software items; and monitoring compliance with the usage conditions using the contract; and in response to detecting non-compliance, blocking access to a corresponding software item in the list of software items.

15 Claims, 3 Drawing Sheets

(56) References Cited

U.S. PATENT DOCUMENTS

| | | | |
|---|---|---|---|
| 2021/0182366 A1* | 6/2021 | Fan .................. | G06F 21/105 |
| 2021/0209197 A1* | 7/2021 | Block ................ | G06Q 50/184 |
| 2021/0209709 A1* | 7/2021 | Slavin ............... | G06Q 30/0185 |
| 2021/0400147 A1* | 12/2021 | Benkreira ........... | H04W 4/24 |
| 2022/0058014 A1* | 2/2022 | Björkman ........... | G06F 21/105 |
| 2022/0171830 A1* | 6/2022 | Gokan ................ | G06F 21/64 |
| 2022/0237069 A1* | 7/2022 | Freeman ............ | G06F 11/3409 |
| 2022/0237267 A1* | 7/2022 | Diaz .................. | H04L 9/3239 |
| 2023/0008345 A1* | 1/2023 | Agrawal ............. | G06F 21/44 |
| 2024/0061909 A1* | 2/2024 | Van der Schaaf ... | G06F 21/105 |

OTHER PUBLICATIONS

Park, Jeohong, et al. "The CONabc Usage Control Model." ACM Transactions on Information and System Security, vol. 7, No. 1, pp. 128-174, Feb. 2004. (Year: 2004).*

St. Laurent, Andrew. "Understanding Open Source and Free Software Licensing." O'Reilly Media, Sebastopol, CA, 95472. (Year: 2004).*

* cited by examiner

SYSTEMS AND METHODS FOR MONITORING SOFTWARE ITEMS BASED ON GENERATED CONTRACTS

FIELD OF TECHNOLOGY

The present disclosure relates to the field of software provisioning, and, more specifically, to systems and methods for monitoring software items based on generated contracts.

BACKGROUND

There are various types of software items accessible to users. Some are provided to users, upon which the users can access the software items without restriction. Others are subscription-based and require being used in a certain manner. For example, users may be limited to a given period of time within which the software item can be accessed. There may exist usage conditions such as a periodic payment of fees or a cap on technical resources.

There are two aspects to the access of such software items. First, a vendor of the software items may be interested in optimizing their revenue. For example, vendors may create quotes that can contain a mix of one-off sales (e.g., hardware, installation, etc.) and subscription offerings. When a user accepts a quote, the vendor needs to add the subscription line items in their accounting system or subscription billing engine. This manual task consumes time, is prone to errors, and can be forgotten. This results in profit loss, late payments, no payment, and/or cashflow issues.

The second aspect involves determining whether the software items are being used in the manner indicated on the quote. If the software item is being improperly used (e.g., used past the allotted time period), the vendor is also losing revenue. However, monitoring usage conditions must be done in an efficient manner such that a significant amount of processing and memory resources are not consumed.

SUMMARY

In one exemplary aspect, the techniques described herein relate to a method for monitoring software items using a generated contract, the method including: transmitting a quote for viewing on a computing device associated with a first person, wherein the quote includes a list of software items included in a transaction; in response to receiving an approval of the quote by the first person, generating a contract governing the transaction by: extracting the list of software items from the quote; retrieving software item information for each of the list of software items; determining, based on the software item information and for inclusion in the contract, usage conditions that the first person has to comply with to access software items in the list of software items; and monitoring compliance with the usage conditions using the contract; and in response to detecting non-compliance with at least one of the usage conditions, blocking access to a corresponding software item in the list of software items.

In some aspects, the techniques described herein relate to a method, wherein the list of software items includes one or more of: a software application, a hardware device, a software-as-a-service, a platform-as-a-service, an infrastructure-as-a-service, and a container-as-a-service.

In some aspects, the techniques described herein relate to a method, wherein generating the contract further includes: classifying each respective software item of the list of software items into a subscription-based software item and a non-subscription-based software item based on the software item information; and for each respective subscription-based software item, determining a usage term period after which the subscription-based software item is no longer accessible to the first person, in accordance with a first usage condition of the usage conditions.

In some aspects, the techniques described herein relate to a method, wherein monitoring the compliance further includes: in response to detecting that the usage term period for the respective subscription-based software item has elapsed, blocking access to the respective subscription-based software item for the first person.

In some aspects, the techniques described herein relate to a method, further including: in response to receiving the approval, retrieving at least one pre-existing contract associated with the first person by looking up an identifier of the first person or a vendor providing the list of software items in a contracts database.

In some aspects, the techniques described herein relate to a method, further including: determining whether to include the transaction in the at least one pre-existing contract, wherein generating the contract is further in response to determining not to include the transaction in the at least one pre-existing contract.

In some aspects, the techniques described herein relate to a method, further including: in response to determining to include the transaction in the at least one pre-existing contract, including the usage conditions and the list of software items in the at least one pre-existing contract.

In some aspects, the techniques described herein relate to a method, wherein the contract is a smart contract for a blockchain.

In some aspects, the techniques described herein relate to a method, wherein the software item information includes for each respective software item one or more of: a unique identifier, an software item type, a fee, a usage description, and a developer description.

It should be noted that the methods described above may be implemented in a system comprising a hardware processor. Alternatively, the methods may be implemented using computer executable instructions of a non-transitory computer readable medium.

In some aspects, the techniques described herein relate to a system for monitoring software items using a generated contract, including: a memory; and a hardware processor communicatively coupled with the memory and configured to: transmit a quote for viewing on a computing device associated with a first person, wherein the quote includes a list of software items included in a transaction; in response to receiving an approval of the quote by the first person, generate a contract governing the transaction by: extracting the list of software items from the quote; retrieving software item information for each of the list of software items; and determining, based on the software item information and for inclusion in the contract, usage conditions that the first person has to comply with to access software items in the list of software items; and monitor compliance with the usage conditions using the contract; and in response to detecting non-compliance with at least one of the usage conditions, block access to a corresponding software item in the list of software items.

In some aspects, the techniques described herein relate to a non-transitory computer readable medium storing thereon computer executable instructions for monitoring software items using a generated contract, including instructions for: transmitting a quote for viewing on a computing device associated with a first person, wherein the quote includes a list of software items included in a transaction; in response to receiving an approval of the quote by the first person, generating a contract governing the transaction by: extracting the list of software items from the quote; retrieving software item information for each of the list of software items; determining, based on the software item information and for inclusion in the contract, usage conditions that the first person has to comply with to access software items in the list of software items; and monitoring compliance with the usage conditions using the contract; and in response to detecting non-compliance with at least one of the usage conditions, blocking access to a corresponding software item in the list of software items.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for monitoring software items based on generated contracts. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
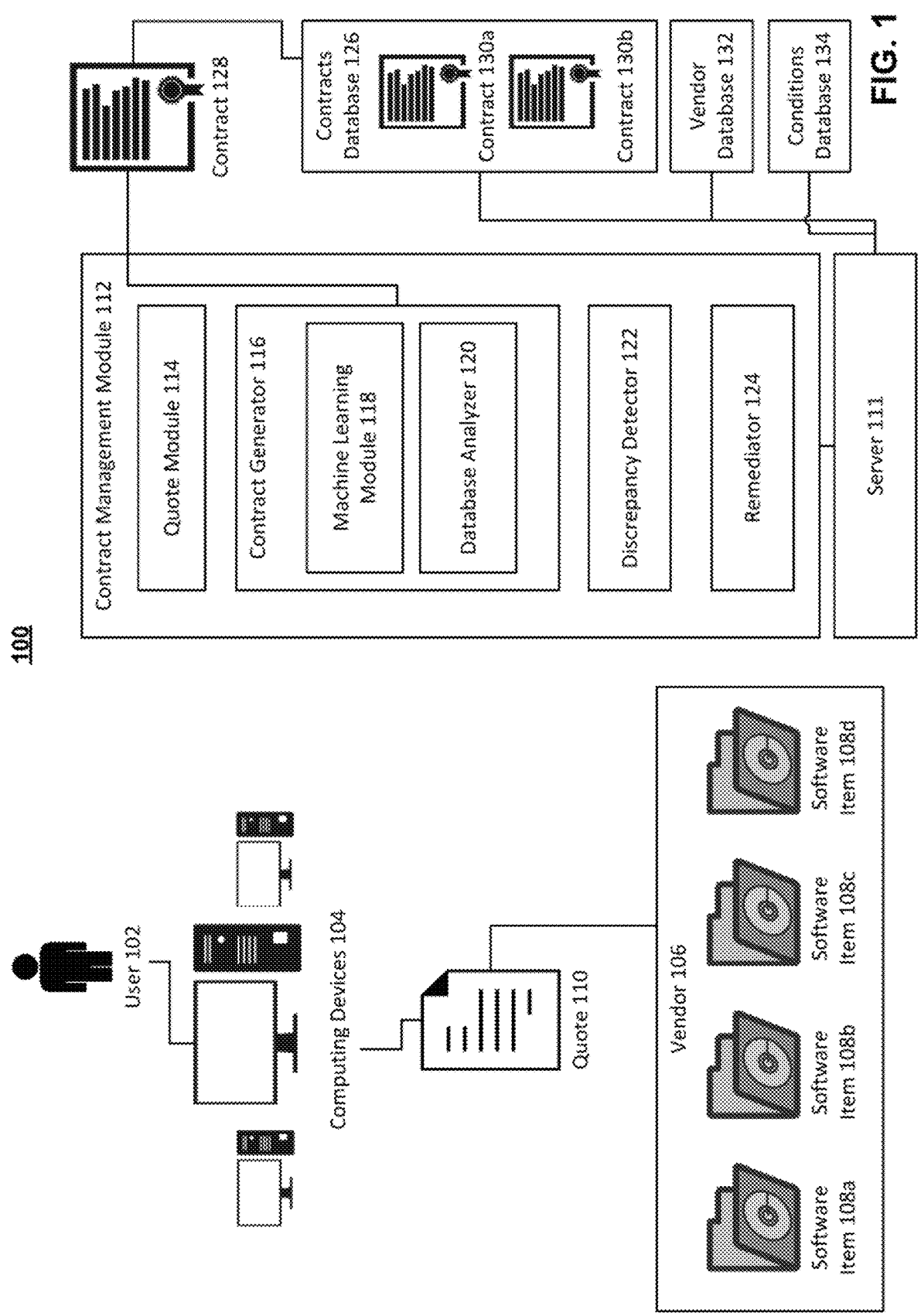
FIG. 1 is a block diagram illustrating a system for monitoring software items based on generated contracts.

FIG. 1 is a block diagram illustrating system 100 for monitoring software items based on generated contracts. In system 100, user 102 may be operating a plurality of computing devices 104. For example, user 102 may represent a person, an institution, a group, or an organization and computing devices 104 may be all of the hardware owned by user 102 (the hardware that can execute software items in particular). Suppose that user 102 represents a university. Each of the computing devices of computing devices 104 may belong to a student or a staff member. In some aspects, each of the computing devices may be connected under a network (e.g., a local area network, a wide area network, etc.).

User 102 may be a customer of vendor 106, which may offer a plurality of software items 108 including software items 108a, 108b, 108c, and 108d. In some aspects, the software items include one or more of: a software application, a hardware device, a software-as-a-service, a platform-as-a-service, an infrastructure-as-a-service, and a container-as-a-service. In some aspects, user 102 may select various software items to purchase or subscribe to. For example, software items 108 may be listed on the website of vendor 106 and user 102 may access the website to make selections. Vendor 106 may issue quote 110 to user 102. Quote 110 may include descriptions of each selection and item information such as pricing. An example of quote 110 is shown below:

TABLE 1

| Quote |  |
| --- | --- |
| Vendor: Vendor 106 |  |
| Customer: User 102 |  |
| Date: Aug. 1, 2020 |  |
| Item | Price |
| Software Item 108a (100 licenses) | $5000 per month |
| Software Item 108c (100 licenses) | $5000 per month |
| Software Item 108d (100 licenses) | $5000 per month |
| Installation Wizard | $1000 |

In the quote, three selected software items are listed. Suppose that user 102 would like to install each software item on one hundred computing devices of computing devices 104. User 102 may request 100 licenses for each item. The total cost for one hundred licenses for each software item may be $5000 per month. In addition, user 102 may select an installation wizard that automatically installs each of the software items in the selected computing devices in a network. The price of the installation wizard may be $1000 for a single time use.

In some aspects, quote 110 is issued using quote module 114 of contract management module 112. Quote module 114 may be used to create, share, accept, and/or reject quotes online. Contract management module 112 may be installed on a remote server 111, and may be accessible online by both user 102 and vendor 106. In some aspects, remote server 111 comprises both a database portion that includes contracts database 126 and a front-end web server that hosts contract management module 112 and/or software items 108.

After user 102 accesses quote 110 via quote module 114, user 102 may accept or reject the quote. If user 102 rejects the quote, vendor 106 receives an indication of the rejection and has an opportunity to renegotiate a new quote. Likewise, when rejecting a quote, user 102 may use quote module 114 to propose a re-negotiated quote. A negotiated quote may feature a new price, additional services, etc. In the event that no agreement is reached, quote 110 is deleted from contract management module 112.

If user 102 accepts quote 110, contract generator 116 generates contract 128 based on quote 110. Contract generator 116 includes machine learning module 118 and database analyzer 120. In a general overview, contract generator 116 determines, using database analyzer 120, whether a contract between user 102 and vendor 106 already exists in contracts database 126. If no contract already exists, contract generator 116 identifies subscription line items in quote 110 and creates a new contract with contract line items. Contract line items include usage conditions for the software items and provide structure to the transaction between user 102 and vendor 106. In some aspects, the usage conditions further indicate which properties should be applied (e.g., customer fixed discount percentage, alignment with other contracts, alignment with current usage of offered services, etc.).

Generating contract 128 may involve first setting a customer, a billing interval, a payment method, a start date, an end date, a billing address, an invoice sending method. Then once the main contract is saved, contract line items are added. When adding a contract line item contract generator 116 identifies the software item, a description, a quantity, a price, a discount (if applicable), and an integration (if applicable). Contract generator 116 sets the service-level agreement (SLA) and stores contract 128 in contracts database 126.

In some aspects, using machine learning module 118, contract generator 116 further determines which quote line items should be converted into sales line items and which ones should be converted into contract line items. For example, in table 1 above, the installation wizard is associated with a one-time payment. Thus, contract generator 116 identifies the installation wizard as a sales line item rather than a subscription line item. In some aspects, once a quote is digitally accepted, contract management module 112 automatically marks the quote one-off sales line items so that those items can be billed immediately.

If database analyzer 120 determines that a contract between user 102 and vendor 106 already exists (e.g., contract 130*a*), instead of making a new contract 128, contract generator 116 may amend the existing contract to include the additional software items. In the case of contract line items that should be added to an existing contract, contract management module 112 makes further checks to prevent contract execution errors (such as determining if the accepted contract period conflicts with the existing contract framework date).

An example for using an existing contract is when a customer already has a contract for several services. The customer may then request a quote to add a service (e.g., an anti-virus service). When contract generator 116 receives the accepted quote, contract generator 116 may select an existing contract (or choose to create a new one). Adding a new service offering to an existing contract has the benefit that the contract including all line items will end on the same date, and all services consumed by a customer is combined in one contract. It should be noted that contract management module 112 will only list existing contracts if they exist, and have not expired.

Figure 2:
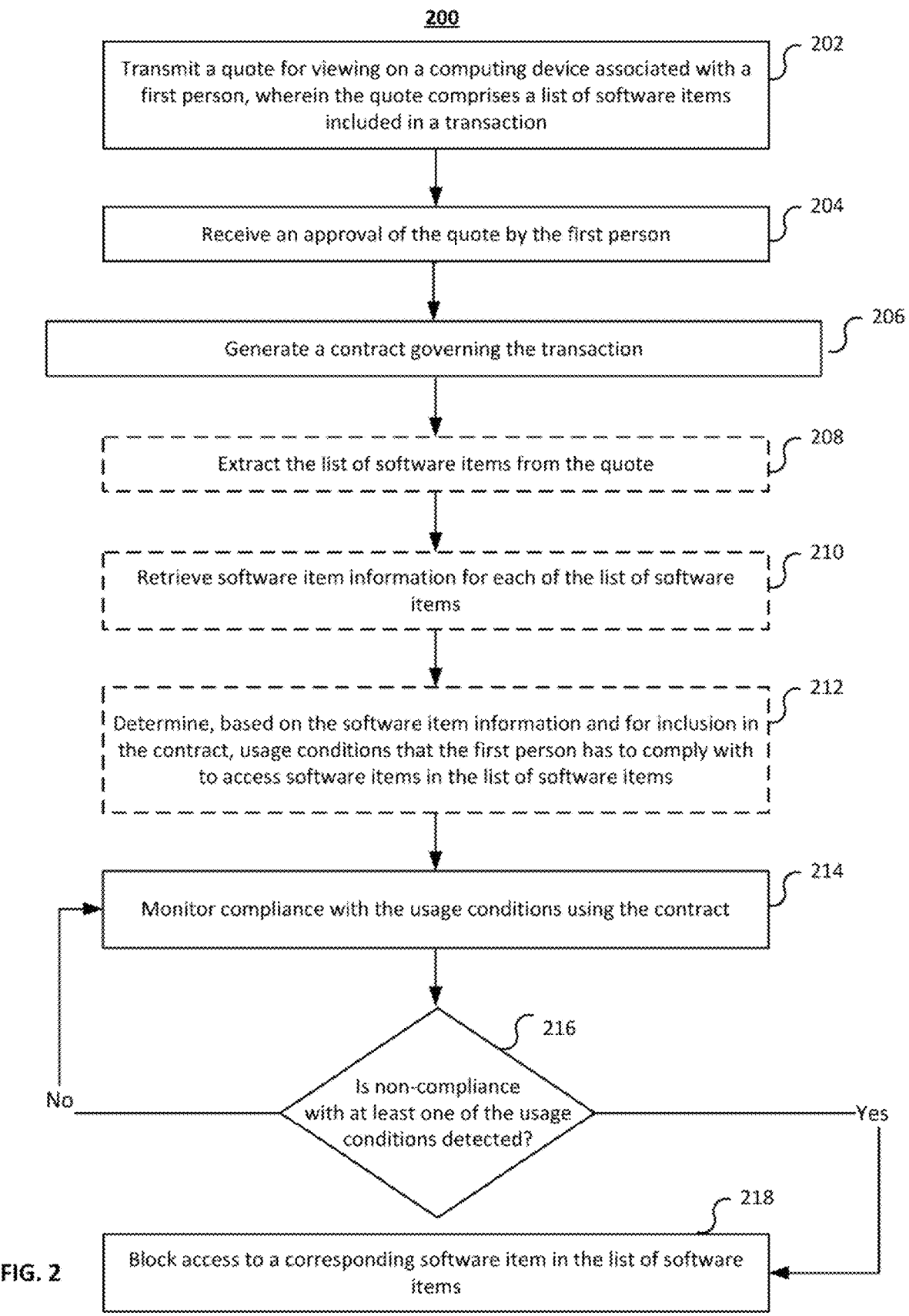
FIG. 2 illustrates a flow diagram of a method for monitoring software items based on generated contracts.

FIG. 2 illustrates a flow diagram of method 200 for monitoring software items based on generated contracts. At 202, quote module 114 transmits a quote (e.g., quote 110) for viewing on a computing device associated with a first person (e.g., one of computing devices 104 of user 102), wherein the quote comprises a list of software items included in a transaction (e.g., software items 108*a*, 108*b*, 108*c*, and/or 108*d*). An example of a quote is shown in table 1 above.

At 204, quote module 114 receives an approval of the quote by the first person. For example, if quote 110 is displayed on a website along with the options to "reject," "accept," or "counter," quote module 114 may receive a selection of the "accept" option from user 102.

At 206, contract generator 116 generates a contract governing the transaction. The details of step 206 are further broken down into steps 208, 210, and 212. For example, at 208, the contract generation process begins with contract generator 116 extracting the list of software items from the quote. Referring to table 1, contract generator 116 identifies that four items are present in the quote: software item 108*a*, software item 108*c*, software item 108*d*, and an installation wizard. In general, quotes may have a similar structure in which the header features information about the entities involved in the transaction (e.g., names, addresses, timestamps, contact numbers/emails, etc.). The body of the quote may feature a table that lists the products and the prices. Contract generator 116 may specifically identify the software items using text classification techniques. A simple approach may involve extracting a term from each row in the column labelled "Item."

At 210, contract generator 116 retrieves software item information for each of the list of software items. The software item information comprises for each respective software item one or more of: a unique identifier, an software item type, a fee, a usage description, and a developer description. A portion of this information is retrieved from the quote itself. For example, software item information may include information such as pricing, method of payment, frequency of billing, name of developer, etc. These details are typically present in the quote itself. Another portion of software item information may be retrieved from a database of the vendor. The database may include terms and conditions for each software item, information about software capabilities and restrictions, logs of bugs and patches, upgrade windows, etc.

Consider an example in which software item 108*a* is a cloud storage service that enables user 102 to upload local files from computing devices 104 and access them via remote server(s). Quote 110 indicates that user 102 is purchasing 100 licenses for a price of $5000 per month (e.g., $50 per license). Contract generator 116 may look up a pricing table associated with software item 108*a* in vendor database 132 of vendor 106 to determine that this price is associated with 5 TB of storage per license. Based on the terms and conditions retrieved for software item 108*a* from vendor database 132, contract generator 116 may further determine that users of software item 108*a* are restricted from uploading illegal media files or malicious files (e.g., viruses, malware, etc.) to the cloud storage.

In some aspects, when generating the contract, contract generator 116 classifies each respective software item of the list of software items into a subscription-based software item and a non-subscription-based software item based on the software item information. For each respective subscription-based software item, contract generator 116 determines a usage term period (used interchangeably with active period) after which the subscription-based software item is no longer accessible to the first person. For example, contract generator 116 may further determine that the default contract period or subscription length is one year unless specified in the quote. In some cases, the quote indicates the duration of the active period.

In some aspects, non-subscription-based software items (e.g., the installation wizard) are one-time purchases. Accordingly, rather than waiting for the first bill/invoice to be issued as part of the contract created for the subscription-based items, contract management module 112 may transmit an invoice to user 102 for the non-subscription-based software items. In some aspects, the non-subscription-based software items are not included in contract 128 generated by contract generator 116.

At 212, contract generator 116 determines, based on the software item information and for inclusion in the contract, usage conditions that the first person has to comply with to access software items in the list of software items. Based on the information retrieved from vendor database 132 and the quote 110, contract generator 116 may generate contract 128 with the following usage conditions for software item 108*a*:

TABLE 2

Sample Usage Conditions for Software Item

During the active period between Aug. 1, 2020 and
Aug. 1, 2021 (inclusive), user must:
Provide a payment of $5000 at the start of each month using
the original payment method
Download software item 108a to at most 100 computing
devices at a time
Use at most 5 TB of storage per license
Not upload malicious objects onto the cloud storage
Not upload illegal objects onto the cloud storage
Sign the terms and conditions of software item 108a
Access to software item 108a is limited to within the active period The usage conditions in table 2 are sample conditions. One skilled in the art will appreciate that there may be more or fewer conditions for a software item and the language of a usage condition may change depending on the software item in question and the vendor. Contract generator 116 may be programmed to extract software item information and search for specific attributes that can be converted into pre-generated conditions. For example, contract generator 116 may refer to conditions database 134 that includes a variety of usage condition templates depending on the type of software item. Conditions database 134 may, for example, include conditions for software item types such as "storage," "blockchain," "computing," "cybersecurity," etc. Contract generator 116 may extract all usage condition templates for the software type in question to include in contract 128 and then fill in the missing information. In the case of "storage," a sample template may state "a user must use at most _____ of storage per license" and in response to determining that the agreed upon storage limit is 5 TB, the usage condition generated by contract generator 116 becomes "a user must use at most 5 TB of storage per license."

In some aspects, contract generator 116 uses machine learning module 118 to generate contract 128. Machine learning module 118 may include multiple machine learning algorithms. For example, a first algorithm (e.g., a Bayes classifier) of machine learning module 118 may receive a plurality of historic contracts and classify them into various software item types (e.g., some contracts may be classified as storage software item contracts, others may be classified as cybersecurity software item contracts). A second algorithm (e.g., principal component analysis and feature selection) of machine learning module 118 may identify reoccurring usage conditions in a particular type of software item contract by analyzing the classified contracts. For example, the second algorithm may determine that usage conditions such as "a user must use at most _____ of storage per license" occur in almost all contracts. Accordingly, the second algorithm generates a template for that usage condition for storage in conditions database 134. A third algorithm may be configured to populate usage condition templates with information in quotes and vendor database 132. For example, the third algorithm may be trained using a plurality of quotes and their associated contracts. In particular, the usage condition templates extracted from the associated contracts and the quotes are input as training vectors such that the third algorithm can identify which numbers and terms are taken from the quotes and entered into the usage conditions. Once trained, the third algorithm may automatically identify information in an arbitrary quote that needs to be entered into a contract. In particular, machine learning module 118 may classify the type of contract to generate based on the features in the quote and information about the vendor, identify the usage conditions associated with the type, and fill in the usage condition parameters using the third algorithm.

The usage conditions in a contract are generally phrased as binary conditions. For example, either a user has met a condition or has not (e.g., has uploaded illegal content or has not, has used more licenses than allotted, has not made a payment, etc.). Consider an example of contract 128 below:

TABLE 3

Contract

Contract 128 Contract Identifier: ABC12354
Active Period: Aug. 1, 2020-Aug. 1, 2021
Computing Device Members: Computing Device 104-A, Computing Device 104-B, Computing
Device 104-C, Computing Device 104-D
Device Identifiers: D1104A, D1104B, D1104C, D1104D
Software Item Members: Software Item 108a, Software Item 108b, Software Item 108c,
Software Item 108d
Software Item Identifiers: S108A, S108B, S108C, S108D Allocations

| Device | Software Item | Price | Usage Conditions |
| --- | --- | --- | --- |
| D1104A | S108A | 5000.00 | During the active period, user must: Provide a payment of $5000 at the start of each month using the original payment method Download software item 108a to at most 100 computing devices at a time Use at most 5 TB of storage per license Not upload malicious objects onto the cloud storage Not upload illegal objects onto the cloud storage Sign the terms and conditions of software item 108a Access to software item 108a is limited to within the active period |

TABLE 3-continued

| | | | Contract |
|---|---|---|---|
| D1104C | S108A | ... | ... |
| ... | ... | | |
| D1104B | S108C | 5000.00 | During the active period, user must:<br>Provide a payment of $5000 at the start of each month using the original payment method<br>Download software item 108c to at most 100 computing devices at a time<br>Read at most 1000 documents<br>Write at most 400 documents<br>Sign the terms and conditions of software item 108c<br>Access to software item 108c is limited to within the active period |
| D1104D | S108D | 5000.00 | During the active period, user must:<br>Provide a payment of $5000 at the start of each month using the original payment method<br>Download software item 108d to at most 100 computing devices at a time<br>Sign the terms and conditions of software item 108d<br>Access to software item 108d is limited to within the active period |

Each of software items 108 may have a particular software identifier and each computing device of devices 104 may have a device identifier. These identifiers may be unique to the software items and computing devices. For example, a device identifier may be a MAC address. Database analyzer 120 may search contracts database 126 for a contract (e.g., contract 128) that mentions both a software identifier and device identifier.

In the exemplary contract above, each device 104 has been allocated a subset of software items 108. For example, computing device 104-D can access software item 108d, but no other software item. If computing device 104-D attempts to access any other software item 108, the contract is breached. If computing device 104-D attempts to access software item 108d such that the access does not comply with the usage conditions, the contract is breached.

Accordingly, at 214, discrepancy detector 122 monitors compliance with the usage conditions using the contract. At 216, discrepancy detector 122 determines whether non-compliance with at least one of the usage conditions is detected. In response to detecting non-compliance with at least one of the usage conditions, method 200 advances to 218, where remediator 124 blocks access to a corresponding software item in the list of software items. If non-compliance is not detected, discrepancy detector 122 continues monitoring until the active period of the contract expires (e.g., until Aug. 1, 2021).

Discrepancy detector 122 determines whether a discrepancy between the at least one usage condition in the contract and the active usage of the first software item on a computing device exists (i.e., non-compliance).

For example, the at least one usage condition may indicate a usage term period after which the first software item is no longer accessible to the first computing device, and wherein determining whether the discrepancy exists comprises determining that the usage term period has elapsed. In the example above, an active period (used interchangeably with usage term period) is until 12:00:00 of Aug. 1, 2021. After this point, software item 108d should not be accessible to computing device 104-D unless the contract is renegotiated or a new contract is made. If access is attempted and the discrepancy is detected, remediator 124 may prevent the access.

In another example, the at least one usage condition indicates a maximum number of computing devices that can run the first software item in the network (e.g., the maximum number of licenses), and wherein determining whether the discrepancy exists comprises determining that a new computing device on which the software item is installed causes the maximum number to be exceeded. For example, certain contracts may be flexible and simply allow all computing devices under a network to access any given software item 108a (i.e., 100 devices of user 102 can access software item 108a). However, as new devices are added to user 102's network (e.g., new students or employees join the network), the details in contract 128 may become outdated. Suppose that computing device 104-E is a new device not mentioned in contract 128. Software items 108 may be installed on computing device 104-E by user 102. When a software item is launched, because contract 128 does not include computing device 104-E (or the number of licenses have been exceeded), discrepancy detector 122 may determine that contract 128 has been violated (i.e., non-compliance is detected).

In some aspects, the contract is a smart contract for a blockchain. The smart contract may be executed by the blockchain network to verify if a node is properly using a software item.

In some aspects, prior to generating contract 128 for user 102 and vendor 106, contract generator 116 determines whether an active contract already exists between user 102 and vendor 106. An active contract is one in which at least one software item that is subscription-based is accessible to user 102. This is typically indicated by an active period listed in the contract. Because user 102 may have several hundred computing devices and may be subscribed to multiple software items, enforcing contracts may be a processing and memory demanding task. If multiple contracts exist for the same user and vendor, server 111 becomes tasked with finding and evaluating multiple contracts and their individual usage conditions. To streamline this process, contract management module 112 may consolidate contracts in which the user and vendor are the same. The consolidation process is made more efficient if multiple contracts are not generated in the first place.

For example, in response to receiving the approval, database analyzer 120 may search contracts database 126 and retrieve at least one pre-existing contract associated with the user 102 by looking up an identifier of user 102 and/or vendor 106 providing the list of software items. Contract generator 116 may determine whether to include the transaction in the at least one pre-existing contract, wherein generating the contract is further in response to determining not to include the transaction in the at least one pre-existing contract. Suppose that database analyzer 120 scans all contracts include contracts 130a and 103b, and determines that contract 130b is an existing active contract between user 102 and vendor 106. Rather than generating contract 128, contract generator 116 may include the usage conditions that would be entered in a new contract, in the at least one pre-existing contract. For example, if a new contract would indicate the details of the contract in table 3, the usage conditions in table 3 are simply added to the existing contract. Thus, when enforcing contracts between user 102 and vendor 106, contract management module 112 does not need to find multiple contracts and simultaneously monitor usage for all of them. Instead, contract management module 112 simply focuses on one contract and evaluates for non-compliance.

Figure 3:
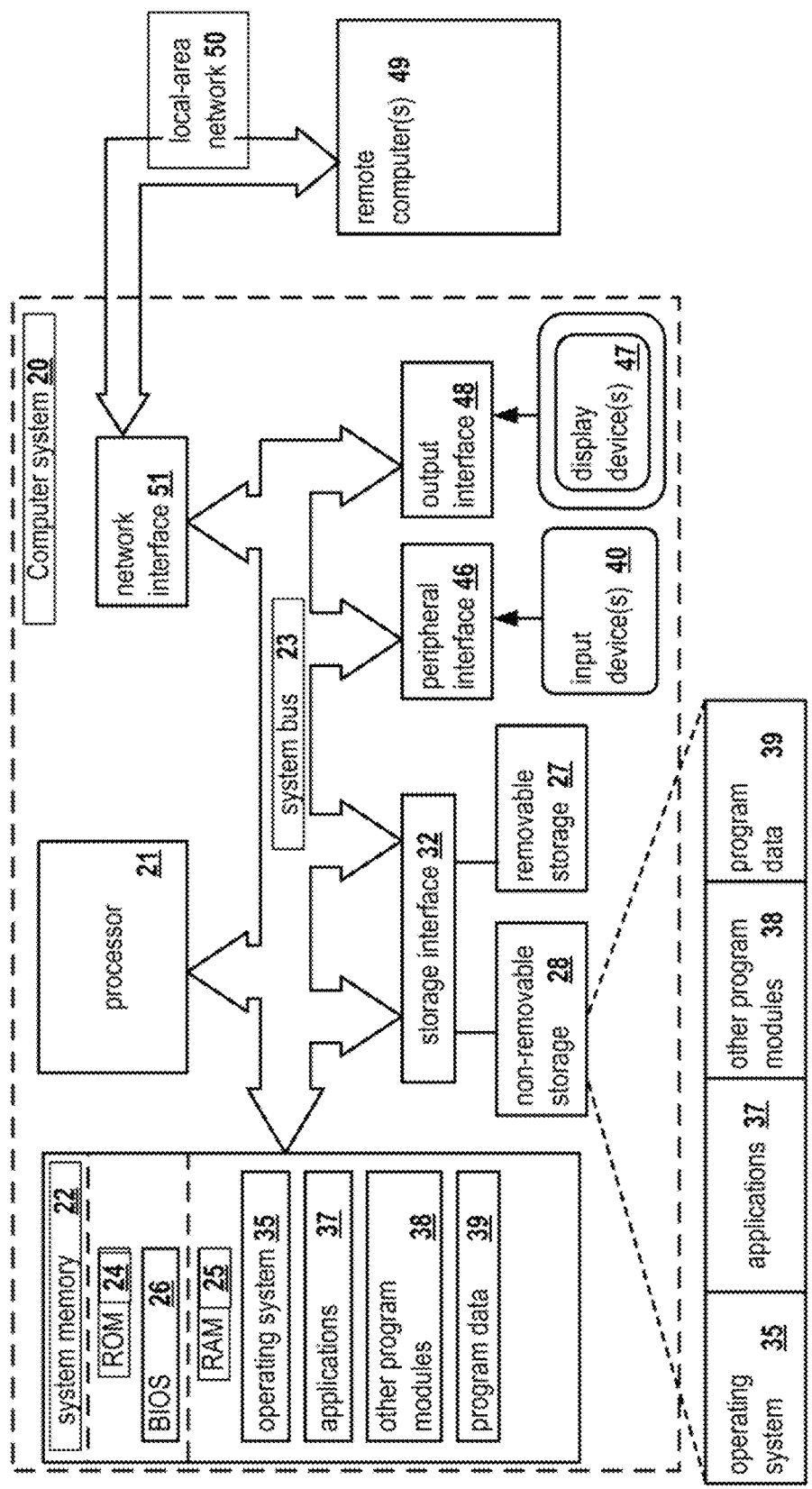
FIG. 3 presents an example of a general-purpose computer system on which aspects of the present disclosure can be implemented.

FIG. 3 is a block diagram illustrating a computer system 20 on which aspects of systems and methods for monitoring software items based on generated contracts may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for monitoring software items using a generated contract, the method comprising:
   transmitting a quote for viewing on a computing device associated with a first person, wherein the quote comprises a list of software items included in a transaction;
   in response to receiving an approval of the quote by the first person, generating a contract governing the transaction by:
      extracting the list of software items from the quote;
      retrieving software item information for each of the list of software items;
      executing a first machine learning model trained to classify each of a plurality of historical contracts into various software item types, wherein executing comprises: classifying, using the first machine learning model trained on the plurality of historical contracts to distinguish between subscription-based and non-subscription-based items, each respective software item of the list of software items into a subscription-based software item and a non-subscription-based software item based on the software item information; and
      executing a second machine learning model trained to identify, in the plurality of historical contracts, reoccurring usage conditions associated with a particular software item type, and generate at least one template for the reoccurring usage conditions, wherein the particular software item type is a subscription-based software item;
      executing a third machine learning model trained to populate the at least one template with information in the quote, wherein training the third machine learning model comprises:
         identifying training usage condition templates from training contracts and associated quotes;
         determining numbers and terms taken from the associated quotes and entered into the training usage condition templates; and identifying information in an arbitrary quote that should be entered into a given contract based on the determined numbers and terms;

determining, based on the software item information and for inclusion in the contract, usage conditions that the first person has to comply with to access software items in the list of software items, wherein the usage conditions comprise the at least one template populated with the information in the quote, wherein determining the usage conditions comprises:

for each respective subscription-based software item, determining a usage term period after which the subscription-based software item is no longer accessible to the first person, in accordance with a first usage condition of the usage conditions; and monitoring compliance with the usage conditions using the contract; and in response to detecting non-compliance with at least one of the usage conditions, blocking access to a corresponding software item in the list of software items, wherein detecting the non-compliance comprises in response to detecting that the usage term period for the respective subscription-based software item has elapsed, blocking access to the respective subscription-based software item for the first person.

2. The method of claim 1, wherein the list of software items includes one or more of: a software application, a hardware device, a software-as-a-service, a platform-as-a-service, an infrastructure-as-a-service, and a container-as-a-service.

3. The method of claim 1, further comprising:
in response to receiving the approval, retrieving at least one pre-existing contract associated with the first person by looking up an identifier of the first person or a vendor providing the list of software items in a contracts database.

4. The method of claim 3, further comprising:
determining whether to include the transaction in the at least one pre-existing contract, wherein generating the contract is further in response to determining not to include the transaction in the at least one pre-existing contract.

5. The method of claim 4, further comprising:
in response to determining to include the transaction in the at least one pre-existing contract, including the usage conditions and the list of software items in the at least one pre-existing contract.

6. The method of claim 1, wherein the contract is a smart contract for a blockchain.

7. The method of claim 1, wherein the software item information comprises for each respective software item one or more of: a unique identifier, an software item type, a fee, a usage description, and a developer description.

8. A system for monitoring software items using a generated contract, comprising:
a memory; and
a hardware processor communicatively coupled with the memory and configured to:
transmit a quote for viewing on a computing device associated with a first person, wherein the quote comprises a list of software items included in a transaction;
in response to receiving an approval of the quote by the first person, generate a contract governing the transaction by:
extracting the list of software items from the quote;
retrieving software item information for each of the list of software items;
executing a first machine learning model trained to classify each of a plurality of historical contracts into various software item types, wherein executing comprises: classifying, using the first machine learning model trained on the plurality of historical contracts to distinguish between subscription-based and non-subscription-based items, each respective software item of the list of software items into a subscription-based software item and a non-subscription-based software item based on the software item information; and
executing a second machine learning model trained to identify, in the plurality of historical contracts, reoccurring usage conditions associated with a particular software item type, and generate at least one template for the reoccurring usage conditions, wherein the particular software item type is a subscription-based software item;
executing a third machine learning model trained to populate the at least one template with information in the quote, wherein training the third machine learning model comprises:
identifying training usage condition templates from training contracts and associated quotes;
determining numbers and terms taken from the associated quotes and entered into the training usage condition templates; and
identifying information in an arbitrary quote that should be entered into a given contract based on the determined numbers and terms;
determining, based on the software item information and for inclusion in the contract, usage conditions that the first person has to comply with to access software items in the list of software items, wherein the usage conditions comprise the at least one template populated with the information in the quote, wherein determining the usage conditions comprises:
for each respective subscription-based software item, determining a usage term period after which the subscription-based software item is no longer accessible to the first person, in accordance with a first usage condition of the usage conditions; and
monitoring compliance with the usage conditions using the contract; and
in response to detecting non-compliance with at least one of the usage conditions, blocking access to a corresponding software item in the list of software items, wherein detecting the non-compliance comprises in response to detecting that the usage term period for the respective subscription-based software item has elapsed, blocking access to the respective subscription-based software item for the first person.

9. The system of claim 8, wherein the list of software items includes one or more of: a software application, a hardware device, a software-as-a-service, a platform-as-a-service, an infrastructure-as-a-service, and a container-as-a-service.

10. The system of claim 8, wherein the hardware processor is further configured to:
in response to receiving the approval, retrieve at least one pre-existing contract associated with the first person by looking up an identifier of the first person or a vendor providing the list of software items in a contracts database.

11. The system of claim 10, wherein the hardware processor is further configured to:
determine whether to include the transaction in the at least one pre-existing contract, wherein generating the contract is further in response to determining not to include the transaction in the at least one pre-existing contract.

12. The system of claim 11, wherein the hardware processor is further configured to:
in response to determining to include the transaction in the at least one pre-existing contract, include the usage conditions and the list of software items in the at least one pre-existing contract.

13. The system of claim 8, wherein the contract is a smart contract for a blockchain.

14. The system of claim 8, wherein the software item information comprises for each respective software item one or more of: a unique identifier, an software item type, a fee, a usage description, and a developer description.

15. A non-transitory computer readable medium storing thereon computer executable instructions for monitoring software items using a generated contract, including instructions for:
transmitting a quote for viewing on a computing device associated with a first person, wherein the quote comprises a list of software items included in a transaction;
in response to receiving an approval of the quote by the first person, generating a contract governing the transaction by:
extracting the list of software items from the quote;
retrieving software item information for each of the list of software items;
executing a first machine learning model trained to classify each of a plurality of historical contracts into various software item types, wherein executing comprises: classifying, using the first machine learning model trained on the plurality of historical contracts to distinguish between subscription-based and non-subscription-based items, each respective software item of the list of software items into a subscription-based software item and a non-subscription-based software item based on the software item information; and
executing a second machine learning model trained to identify, in the plurality of historical contracts, reoccurring usage conditions associated with a particular software item type, and generate at least one template for the reoccurring usage conditions, wherein the particular software item type is a subscription-based software item;
executing a third machine learning model trained to populate the at least one template with information in the quote, wherein training the third machine learning model comprises:
identifying training usage condition templates from training contracts and associated quotes;
determining numbers and terms taken from the associated quotes and entered into the training usage condition templates; and
identifying information in an arbitrary quote that should be entered into a given contract based on the determined numbers and terms;
determining, based on the software item information and for inclusion in the contract, usage conditions that the first person has to comply with to access software items in the list of software items, wherein the usage conditions comprise the at least one template populated with the information in the quote, wherein determining the usage conditions comprises:
for each respective subscription-based software item, determining a usage term period after which the subscription-based software item is no longer accessible to the first person, in accordance with a first usage condition of the usage conditions; and
monitoring compliance with the usage conditions using the contract; and
in response to detecting non-compliance with at least one of the usage conditions, blocking access to a corresponding software item in the list of software items, wherein detecting the non-compliance comprises in response to detecting that the usage term period for the respective subscription-based software item has elapsed, blocking access to the respective subscription-based software item for the first person.

* * * * *